United States Patent [19]

Choquet

[11] 4,152,649
[45] May 1, 1979

[54] CHANNEL EQUALIZATION APPARATUS AND METHOD USING THE FOURIER TRANSFORM TECHNIQUE

[75] Inventor: Michel Choquet, Vence, France

[73] Assignee: International Business Machines Corporation, Armonk, N.Y.

[21] Appl. No.: 808,934

[22] Filed: Jun. 21, 1977

[30] Foreign Application Priority Data

Jul. 8, 1976 [FR] France .................. 76 21555

[51] Int. Cl.² .......................... H04B 3/06
[52] U.S. Cl. ....................... 325/42; 325/324; 333/18
[58] Field of Search ............. 325/42, 323, 324; 333/18

[56] References Cited

U.S. PATENT DOCUMENTS

| | | | |
|---|---|---|---|
| 3,581,279 | 5/1971 | Arbuckle | 325/41 |
| 3,582,879 | 6/1971 | Sullivan | 325/323 |
| 3,614,673 | 10/1971 | Kang | 328/167 |
| 3,747,024 | 7/1973 | Choquet et al. | 332/9 R |
| 3,864,632 | 2/1975 | Chang | 325/42 |
| 3,947,768 | 3/1976 | DesBlache et al. | 325/42 |
| 4,024,342 | 5/1977 | Croisier et al. | 325/324 |
| 4,027,257 | 5/1977 | Perreault | 325/42 |
| 4,027,258 | 5/1977 | Perreault | 324/42 |
| 4,089,061 | 5/1978 | Milewski | 325/42 |

OTHER PUBLICATIONS

"Principles of Data Communications"–Lucky, Salz & Weldon, New York, 1968, Chapters 6, 7, 9.
"Cyclic-Equalization-A New Rapidly Converging Equalization Technique for Synchronous Data Communication"–Mueller and Spaulding B.S.T.J., Feb. 1975, pp. 369–406.
"A New Equalization Technique"–Tien-Lin Chang–Proceedings of the National Electronics Conference, 1973, Oct. 1973, pp. 335–338.
"Adaptive Maximum Likelihood Receiver for Carrier Modulated Data Transmission Systems"–Ungerboeck, IEEE Trans. on Comm., vol. CM-22, #5, May, 1974, pp. 624–636.
"Simultaneous Adaptive Estimation and Decision Algorithm for Carrier Modulated Data Transmission Systems"–Kobayashi, IEEE Trans. on Comm. Tech., vol. COM-19, #3, Jun., 1971, pp. 268–280.
"Signal Theory"–L. E. Franks, Englewood Cliffs, N.J.–Prentice-Hall, 1969, Section 4—4, pp. 79–97.
"What is the Fast Fourier Transform"–Cochran et al., IEEE Trans. on Audio and Electroacoustics, Jun., 1967, pp. 45–55.
"Digital Real Time Spectral Analysis"–Bergland and Hale, IEEE Trans on Electronic Computers, Apr. 1967, pp. 180–185.
"A Digital Processor to Generate Spectra in Real Time"–Shiveley, IEEE Trans. on Computers, vol. 3–17, #5, May 1968.
"Fast Fourier Transform Hardware Implementations"–Bergland, IEEE Trans. on Audio and Electroacoustics, vol. AU17, Jun. 1969, pp. 104–108.

*Primary Examiner*—Robert L. Griffin
*Assistant Examiner*—Marc E. Bookbinder
*Attorney, Agent, or Firm*—John B. Frisone

[57] ABSTRACT

A method of and apparatus for determining during an initial training period the initial values of the coefficients of a transversal equalizer in a data transmission system in which the transmission channel creates frequency shift. The received periodic training sequence is modulated by a time-domain window signal whose Fourier transform exhibits a relatively flat central peak and has comparatively low values in the vicinity of those frequencies which are a multiple of the inverse of the period of the transmitted sequence, and the discrete Fourier transform $W_k$ of the modulated signal is computed. The values of the coefficients of the equalizer are obtained by computing the inverse discrete Fourier transform of the ratio $F_k = Z_k/W_k$, where $Z_k$ is the discrete Fourier transform of the transmitted sequence.

12 Claims, 10 Drawing Figures

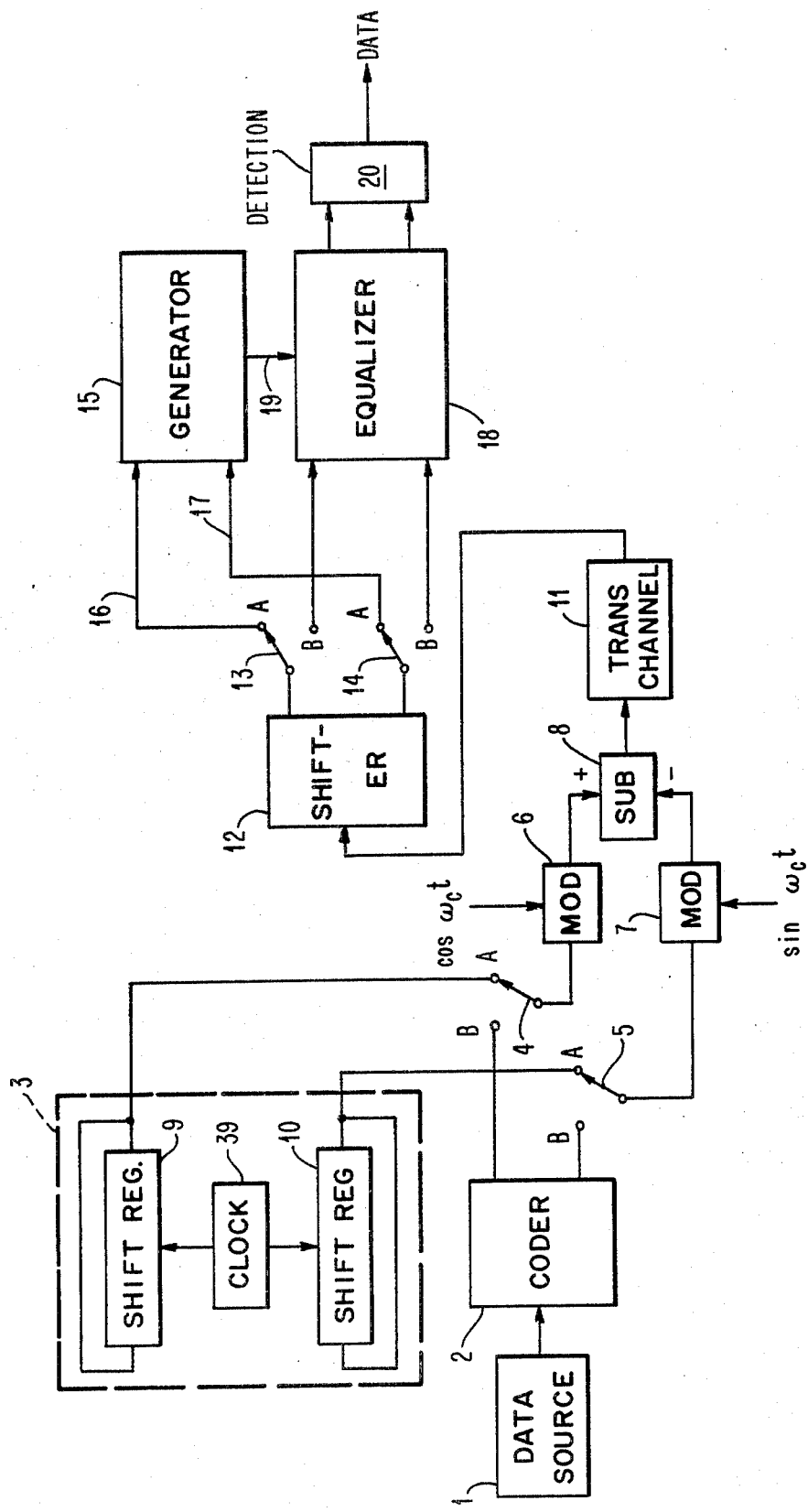

CHANNEL EQUALIZATION APPARATUS AND METHOD USING THE FOURIER TRANSFORM TECHNIQUE

BACKGROUND ON THE INVENTION

This invention relates to synchronous data transmission systems and, more particularly, to a method and to an apparatus for quickly determining the initial values of the coefficients of a transversal equalizer in such a system.

In synchronous data transmission systems, the message to be transmitted is in the form of a bit sequence and is first converted into a sequence of symbols, where each symbol can take one of a discrete number of values which number is generally selected as equal to a power of two. The symbols are then sent over a transmission channel at a given rate, called signaling rate, in the form of pulses that may or may not be modulated depending on whether or not the transmission system uses a carrier modulation technique. Generally, the transmission channels, and more particularly, the telephone lines, introduce amplitude and phase distortions that modify the shape of the signals. These distortions are generally due to the imperfect transfer characteristics of the transmission channels involved and are aggravated by the noise introduced therein by external sources. The control of such distortions and noise presents varying degrees of difficulty, for example, the amplitude and phase distortions can create an interaction between successive signals. This interaction, known as intersymbol interference, can preclude reliable detection of the data signals at the receiver. In the higher speed data transmission systems, the receivers are generally provided with a device designed to minimize the effects of intersymbol interference before the data are detected. Such a device is called an equalizer.

The type of equalizer which is the most widely used at the present time is the automatic transversal equalizer described, for example, in "Principles of Data Communication," by R. W. Lucky, J. Salz and E. D. Weldon, Jr., Chapter 6, McGraw-Hill, New York, 1969. Such an equalizer consists of a transversal filter whose coefficients are automatically adjusted to meet a given performance criterion. In general, during an initial period referred to as a training period, a set of isolated test pulses or a pseudo-random training sequence is transmitted to allow the coefficients of the equalizer to be adjusted to initial values that are as close as possible to optimum values. Subsequent to the training period, the initial values are not further adjusted during transmission of the message itself unless an adaptive type of equalizer is used.

If the distortion characteristics of the transmission channel vary between successive messages, which may be the case where the channel consists of public telephone lines, a training period must be provided before transmitting each message. However, the efficiency of a data transmission system is usually measured by the ratio of the time interval required for completing transmission of the message to the occupancy time of the line, the latter time interval corresponding essentially to the duration of the training period plus that of the transmission of the message. If the efficiency level is to remain at a suitable level in a high speed data transmission system, in which transmission of a message is typically completed within a few tens of milliseconds, provision must be made for a device capable of minimizing the duration of the training period, that is to say, capable of determining as quickly as possible the initial values of the equalizer's coefficients.

The determination of the initial values of the equalizer's coefficients, referred to hereafter as initial equalization, can be carried out either in the time domain or in the frequency domain.

The initial equalization technique as carried out in the time domain is discussed in an article by K. H. Mueller and D. A. Spaulding entitled "Cyclic Equalization—A New Rapidly Converging Equalization Technique For Synchronous Data Communication," in *The Bell System Technical Journal*, pp. 369–406, February 1975, and in French Patent application No. 75 40417 filed by the assignee of the present applicant on Dec. 30, 1975, and corresponding to U.S. patent application, Ser. No. 743,022, filed Nov. 18, 1976, by A. T. Milewski now U.S. Pat. No. 4,089,061. While the method described in said patent application is quite effective, it has been found that the speed at which the initial equalization is performed could be increased by applying said method to the frequency domain.

The frequency-domain initial equalization technique has been discussed in many publications, particularly in an article by Tien-Lin Chang entitled "A New Equalization Technique," in *Proceedings of the National Electronics Conference* 1973, pp. 335–338, Chicago, Illinois., October 1973. The method described by Tien-Lin Chang is fast and gives satisfactory results in the absence of noise, but is ineffective when the transmission channel is noisy, and even more so when frequency shift is introduced by the channel. As is known, a considerable amount of frequency shift is introduced by most transmission channels, and especially by those which are used in long distance communication links.

SUMMARY OF THE INVENTION

It is, therefore, an object of this invention to overcome these drawbacks by providing a method and an apparatus for carrying out in the frequency domain, the computations for said initial equalization technique which method and apparatus give excellent results even in the presence of frequency shift in the received signal.

It is another object of the invention to provide a method and an apparatus for carrying out said initial equalization technique in the frequency domain which not only give excellent results even in the presence of frequency shift, but are also very fast and require only a reasonable amount of computing power.

It is still another object of the invention to provide a method and an apparatus for carrying out said initial initialization technique in the frequency domain, which lend themselves particularly well to the fast determination of the coefficients of a complex transversal equalizer.

Generally, the invention provides a method for determining the initial values of the coefficients of a transversal equalizer which includes the steps of:

transmitting a known periodic sequence such as a pseudo-random sequence over a transmission channel;

modulating the received signal by means of a time-domain window signal whose Fourier transform exhibits a relatively flat central peak and has a low value in the vicinity of those frequencies which are at some multiples of the inverse of the period of the transmitted sequence, which low value may result, for example, from the existence of double zeros in the Fourier transform;

calculating the discrete Fourier transform $W_k$ of the modulated signal;

calculating the ratio $$F_k = Z_k/W_k$$

where $Z_k$ is the discrete Fourier transform of the known transmitted sequence; and calculating the inverse discrete Fourier transform of $F_k$, to thereby determine the value of the coefficients $c_n$ needed for the equalizer.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 2b shows the Fourier transform of the window signal shown in FIG. 2a.

FIG. 2c shows the spectrum calculated by means of the discrete Fourier transform technique, of the received signal as modulated by the time-domain window signal of FIG. 2a.

FIG. 3 is a block diagram of a data transmission system incorporating the apparatus of the present invention.

DETAILED DESCRIPTION OF THE PREFERRED EMBODIMENT

Figure 1A:
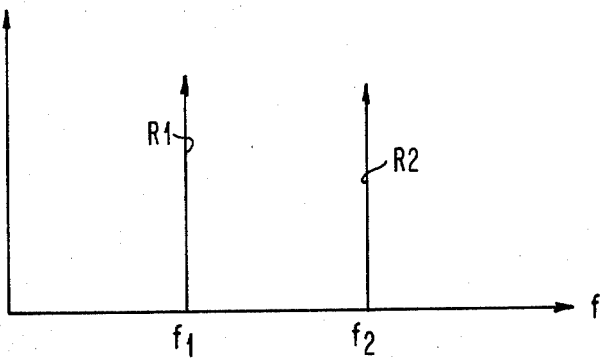
FIG. 1a, is a schematic diagram of the spectrum of rays of the received signal.

The initial equalization in the frequency domain is based upon the following expression:

$$\begin{bmatrix} \text{Spectrum of} \\ \text{transmitted} \\ \text{reference} \\ \text{signal} \end{bmatrix} = \begin{bmatrix} \text{Required} \\ \text{Transfer} \\ \text{Function} \\ \text{of equal-} \\ \text{izer} \end{bmatrix} \times \begin{bmatrix} \text{Spectrum of} \\ \text{signal fed} \\ \text{to equalizer} \\ \text{from trans-} \\ \text{mission line} \end{bmatrix} \quad (1)$$

where the transmitted reference signal is a periodic sequence, for example, a pseudo-random sequence.

The values of the coefficients of the equalizer are determined from its transfer function as derived from expression (1).

It is to be understood that expression (1) must be homogeneous in the sense that:

if the signal fed to the equalizer is a baseband signal, the spectrum of the transmitted reference signal in expression (1) must be the baseband spectrum of the transmitted reference signal, and if the signal fed to the equalizer is a bandpass signal, i.e., a signal modulated by a carrier, the spectrum of the transmitted reference signal in expression (1) must be the passband spectrum of the transmitted reference signal.

Hereafter, this remark will be disregarded and expression (1) will be written:

$$\begin{bmatrix} \text{Spectrum of} \\ \text{transmitted} \\ \text{reference} \\ \text{signal} \end{bmatrix} = \begin{bmatrix} \text{Required} \\ \text{transfer} \\ \text{function} \\ \text{of equal-} \\ \text{izer} \end{bmatrix} \times \begin{bmatrix} \text{Spectrum of} \\ \text{received} \\ \text{signal from} \\ \text{line} \end{bmatrix} \quad (2)$$

A convenient means of applying expression (2) is to use the discrete Fourier transform (DFT). Expression (2) then becomes:

$$\begin{bmatrix} \text{DFT of} \\ \text{reference} \\ \text{signal} \end{bmatrix} = \begin{bmatrix} \text{DFT of} \\ \text{equalizer's} \\ \text{coefficients} \end{bmatrix} \times \begin{bmatrix} \text{DFT of} \\ \text{received} \\ \text{signal} \end{bmatrix} \quad (3)$$

Expression (3) is the expression generally used in the prior art equalization methods such as the method described in the previously mentioned article by Tien-Lin Chang. However, expression (3) corresponds exactly to expression (2), only in the absence of frequency shift. If frequency shift is introduced by the transmission channel, the DFT of the received signal will not yield an exact measurement of the spectrum of the received signal and expression (3) will then be incorrect.

Figure 1B:
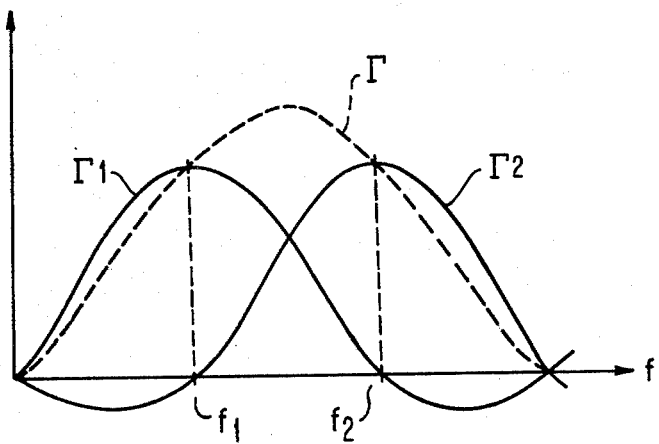
FIG. 1b shows the respective spectra, calculated by means of the discrete Fourier transform technique, of the signal received in the absence of frequency shift.
Figure 1C:
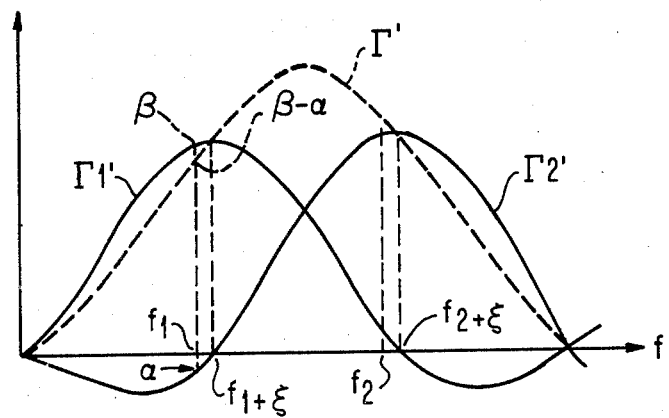
FIG. 1c shows the respective spectra, calculated by means of the discrete Fourier transform technique, of the signal received in the presence of frequency shift.

Referring now to FIGS. 1a-1c, the effects of frequency shift will be shown.

The spectrum of a periodic sequence is comprised of equidistant rays. If the sequence is sent over a transmission channel as a reference signal, the signal received at the input of the receiver will also have a spectrum comprised of rays. Accordingly, all that is required to measure the received signal spectrum is to determine the amplitude of the rays.

For clarity and simplicity, the spectrum of the received signal shown in FIG. 1a comprises only two rays $R_1$ and $R_2$ of equal amplitude at frequencies $f_1$ and $f_2$. Similarly, in the description made with reference to FIGS. 1b and 1c, the term "received signal" will, of course, mean the received signal whose spectrum is shown in FIG. 1a.

If it is assumed that the period of the sequence is $NT$, i.e., that the sequence comprises an N-element configuration repeated at periodic intervals and that the elements are transmitted at a rate $1/T$ by modulating a carrier $f_c$, then the spectrum of the received signal will consist of equidistant rays with a spacing of $1/NT$ Hz. If the elements of the received sequence are designated $s_n$, the amplitude of the $k^{th}$ ray will be given by the expression:

$$S_k = \sum_{n=-\infty}^{+\infty} s_n \exp[-2\pi j (f_c - \frac{k}{NT}) nT] \quad (4)$$

where
$j = \sqrt{-1}$

Expression (4) defines the $k^{th}$ ray at frequency $f_c + k/NT$.

Expression (4) requires that each of the $S_k$ be derived from an infinite number of elements $s_n$ since n varies in this expression from $-\infty$ to $+\infty$. In practice, a finite number of elements $s_n$, for example N elements, is used and expression (4) is written:

$$S_k = \sum_{n=0}^{N-1} s_n \exp\left[-2\pi j \left(f_c - \frac{k}{NT}\right) nT\right] \quad (5)$$

It will be seen that expression (5) is the conventional expression which yields the value of the $k^{th}$ coefficient of the DFT of $s_n$. The fact that only N elements are used to compute the DFT of the received signal means that the received signal is examined during a rectangular time-domain window signal of duration NT. Theoretically, this means that the DFT of the received signal provides the spectrum of the received signal as modulated by a rectangular time-domain window signal whose amplitude is equal to unity and whose duration is NT, rather than the exact spectrum of the received signal. FIG. 1b shows the spectrum of the received signal as modulated by a rectangular window signal of duration NT. As shown, the spectrum $\Gamma$ is the sum of curves $\Gamma 1$ and $\Gamma 2$ which are identical but are respectively centered on $f_1$ and $f_2$. For clarity, FIG. 1b shows only these two curves, which represent the Fourier transform of the rectangular window signal. Curves $\Gamma 1$ and $\Gamma 2$ have a known shape of the type $\sin X/X$. The resultant spectrum $\Gamma$ is the convolution of the spectrum of the received signal by the Fourier transform of the window signal.

It will be noted that curve $\Gamma 1$ has the same amplitude as ray $R_1$ at frequency $f_1$ and that its zero crossing coincides with frequency $f_2$. Similarly, curve $\Gamma 2$ has the same amplitude as ray $R_2$ at frequency $f_2$ and its zero crossing occurs at frequency $f_1$. Curves $\Gamma 1$ and $\Gamma 2$ do not interfer with each other at frequencies $f_1$ and $f_2$, and the sum spectrum $\Gamma$ has the same amplitude as rays $R_1$ and $R_2$ at frequencies $f_1$ and $f_2$, respectively. By computing the DFT at frequencies $f_1$ and $f_2$ of the received signal, that is, by computing the amplitude of the resultant spectrum $\Gamma$ at frequencies $f_1$ and $f_2$, an accurate measurement of the amplitude of rays $R_1$ and $R_2$ is obtained. Expression (3) is, therefore, equivalent to expression (2) where no frequency shift is present, which is the situation shown in FIG. 1b.

FIG. 1c illustrates the elements of the resultant spectrum $\Gamma'$ of the received signal modulated by a rectangular time-domain window signal of duration NT in the presence of a frequency shift $\epsilon$. The resultant spectrum $\Gamma'$ is the sum of curves $\Gamma'_1$ and $\Gamma'_2$ which are identical to curves $\Gamma_1$ and $\Gamma_2$ but, in the example shown in the figure, are centered on frequencies $f_1+\epsilon$ and $f_2+\epsilon$, respectively, rather than on $f_1$ and $f_2$. Curve $\Gamma'_1$ no longer has the amplitude of $R_1$ at $f_1$, which does not greatly matter since the difference in amplitude is not considerable, but the zero crossing of the curve no longer coincides with frequency $f_2$, which is more troublesome. Similarly, the zero crossing of curve $\Gamma'_2$ does not coincide with frequency $f_1$. An interference between curves $\Gamma'_1$ and $\Gamma'_2$, therefore, exists at frequencies $f_1$ and $f_2$. If we examine, for example, what is taking place at frequency $f_1$ and if we represent by $-\alpha$ and $\beta$ the respective amplitudes of $\Gamma'_1$ and $\Gamma'_2$ at $f_1$, we find that the amplitude of the resultant curve $\Gamma'$ will be $(\beta-\alpha)$ at $f_1$. The DFT which gives the amplitude at $f_1$ will thus yield a quantity $(\beta-\alpha)$ which may differ considerably from the amplitude of $R_1$, in which case the DFT will have provided an erroneous amplitude measurement.

The foregoing shows why expression (3) will give incorrect results where frequency shift is present. The method of the present invention will now be described.

As has just been explained, the error introduced by the calculation of the DFT of the received signal in the event of frequency shift being present results from the interference between curves $\Gamma'_1$ and $\Gamma'_2$ at the frequency at which the DFT is calculated, that is, at frequencies $f_1$ and $f_2$ in the example shown in FIG. 1c. In accordance with the present invention, this interference is eliminated by modulating the received signal by means of a triangular time-domain window signal, and by then calculating the DFT of the modulated signal which provides the spectrum of the received signal.

Figure 2A:
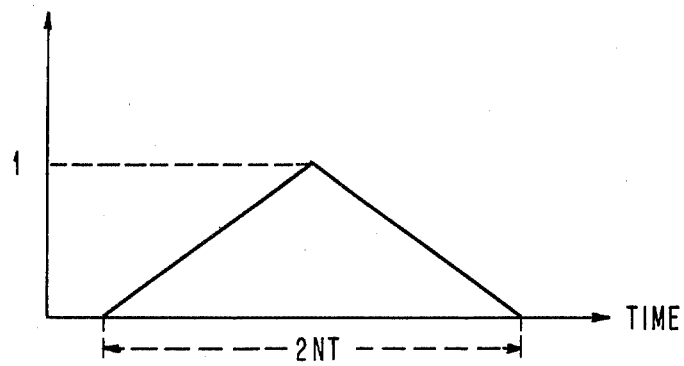
FIG. 2a illustrates, by way of example, a triangular time-domain window signal of the type used in the method of the present invention.
Figure 2B:
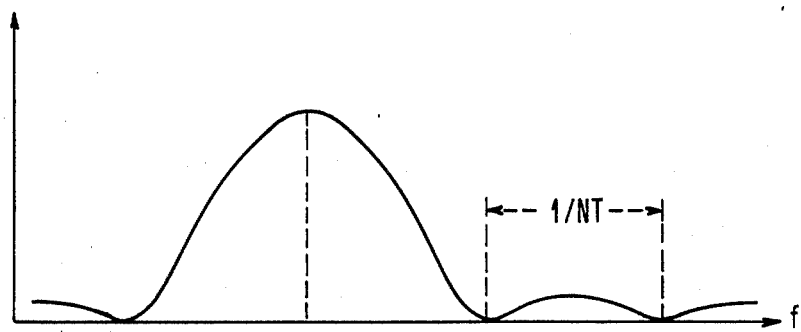

FIG. 2a illustrates the triangular window signal which, in this invention, is one preferred type of window. The length 2NT of this window is twice that of the sequence used as a reference signal. The apex has a normalized amplitude equal to unity. As shown in FIG. 2b, the Fourier transform of such a window is of the form $$(\sin^2 X)/X^2.$$

The main feature of this Fourier transform is that it exhibits a relatively flat central peak and is small and very flat in the vicinity of those frequencies which are multiples of 1/NT Hz. This very flat shape is due to the fact that, in this example, the Fourier transform comprises double zeros at these frequencies. Obviously, any other window signal whose Fourier transform exhibits a relatively flat central peak and has a low value in the vicinity of those frequencies which are multiples of 1/NT Hz can be used to eliminate the interference in the frequency domain.

Figure 2C:
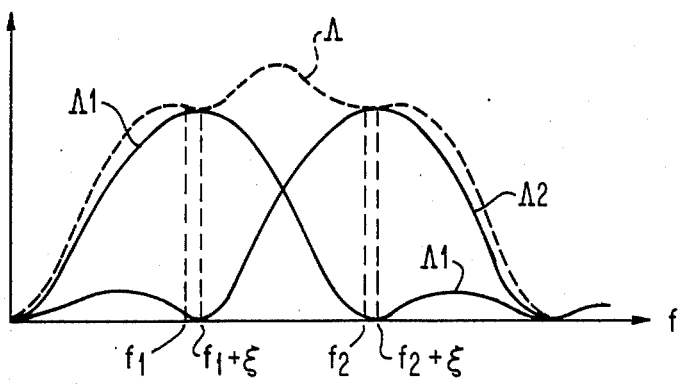

In order to show the manner in which the triangular window signal can be used to eliminate the frequency shift interference, the spectrum (FIG. 1a) of the received signal as modulated by said window is illustrated in FIG. 2c.

The spectrum $\Lambda$ illustrated in this figure is the sum of the Fourier transforms $\Lambda 1$ and $\Lambda 2$ of the triangular window signal centered on frequencies $f_1+\epsilon$ and $f_2+\epsilon$, respectively. It will be seen that, because of their shapes, curves $\Lambda 1$ and $\Lambda 2$ interfere very little with each other at frequencies $f_1$ and $f_2$. The DFT of the received signal modulated by means of the triangular window signal will consequently yield a satisfactory measurement of the amplitude of the rays at $f_1$ and $f_2$ even in the presence of a considerable amount of frequency shift.

The initial equalization method of the present invention is thus based upon the expression:

$$\begin{bmatrix} \text{DFT of} \\ \text{transmitted} \\ \text{reference} \\ \text{signal} \end{bmatrix} = \begin{bmatrix} \text{DFT of} \\ \text{equalizer's} \\ \text{coefficients} \end{bmatrix} \times \begin{bmatrix} \text{DFT of received} \\ \text{signal modulated} \\ \text{by a triangular} \\ \text{type window} \end{bmatrix} \quad (6)$$

which can conveniently be written $$A_k = F_k \times W_k \quad (6')$$

where
$Z_k$ is the DFT of the transmitted reference signal,
$K_k$ is the DFT of the coefficients of the equalizer, and
$W_k$ is the DFT of the received signal modulated by the window signal.

The initial equalization method of the invention which uses expression (6) comprises the following steps:

Step 1: This consists, of course, in transmitting a periodic sequence, for example, a pseudo-random sequence.

Step 2: Modulation of the received signal by a window signal whose Fourier transform exhibits a low value in the vicinity of those frequencies which are multiples of the inverse of the period of the transmitted sequence.

Step 3: Calculation of the DFT $W_k$ of the signal so modulated.

Step 4: Calculation of the ratio $$F_K = Z_k / W_k$$

Step 5: Calculation of the inverse discrete Fourier transform (IDFT) of $F_k$. This yields the values of the coefficients $c_n$ of the equalizer.

Referring to FIGS. 3–6, a preferred embodiment of an apparatus employing the method of the present invention will now be described.

This method lends itself particularly well to the determination of the values of the equalizer's coefficients in a data transmission system utilizing double sideband-quadrature carrier (DSB-QC) modulation; a simplified diagram of such a system incorporating the present invention is shown in FIG. 3.

With the exception of the training sequence generator 3 and the coefficients generator 15, the system shown in FIG. 3 is a conventional data transmission system employing DSB-QC modulation. For simplicity, only those specific elements which are necessary to understand the invention have been illustrated. Thus, conventional devices that exist in transmission systems, such as analog-to-digital converters, sampling devices, filters, clock recovery circuits, etc., have not been shown. DSB-QC modulation is a class of modulation techniques that includes phase-shift keying (PSK), amplitude phase-shift keying (A-PSK), and quadrature-amplitude modulation (QAM). The latter three techniques exhibit similarities and can often be dealt with as a single technique, as indicated, for example, in Chapters 7 and 9 of the above-mentioned book entitled *Principles of Data Communication*, or in an article by G. Ungerboeck entitled "Adaptive Maximum-Likelihood Receiver for Carrier-Modulated Data Transmission Systems," published in *IEEE Transactions on Communications*, Vol. COM-22, No. 5, pp. 624–636, May 1974, or in an article by H. Kobayashi entitled, "Simultaneous Adaptive Estimation and Decision Algorithm for Carrier Modulated Data Transmission Systems," in *IEEE Transactions on Communication Technology*, Vol. COM-19, No. 3, pp. 268–280, June 1971. One of the characteristics of DSB-QC modulation is that the data symbols are representable by complex numbers, Referring again to FIG. 3, the transmitter of the system shown includes a data source 1, a coder 2, a training sequence generator 3, a couple of two-position switches 4 and 5, two modulators 6 and 7, and a subtractor 8. The data source 1 is connected to the input of coder 2, the two outputs of which are respectively connected to contacts at position B of switches 4 and 5. The signal generator 3 is essentially comprised of two shift registers 9 and 10 employing feedback connections. The outputs of these registers are respectively connected to the contacts at position A of switches 4 and 5. The outputs of switches 4 and 5 are respectively connected to the inputs of modulators 6 and 7, the outputs of which are respectively connected to the (+) and (−) inputs of subtractor 8. The output of subtractor 8 is connected to the input of a transmission channel 11, the output of which is connected to a 90° phase shifter 12, the two outputs of which are respectively connected to the inputs of a couple of two-position switches 13 and 14. The A position contacts of switches 13 and 14 are connected via lines 16 and 17 to the inputs of a coefficient generator 15. The B position contacts of the switches are connected to the inputs of a complex transversal equalizer 18 which receives via lines 19 the coefficient values supplied by generator 15. The outputs of equalizer 18 are connected to a detection device 20 which provides the detected data.

In the data mode of operation, that is, when the system is transmitting data, switches 4, 5, 13 and 14 are all set to position B. The sequence of bits to be transmitted, as provided by data source 1, is converted in coder 2 into two sequences of symbols. At each of the signaling instants defined by the signaling rate 1/T expressed in bauds, two symbols, one from each sequence, are respectively fed through switches 4 and 5 to modulators 6 and 7 where they serve to modulate the amplitude of two carriers $\cos \omega_c t$ and $\sin \omega_c t$ which have a 90° phase difference. The output from modulator 7 is subtracted from that of modulator 6 by subtractor 8 and the resultant signal is transmitted over channel 11. The signal transmitted at each signaling instant can take on any one of M distinct values represented by a set of M complex numbers. In general, $M = 2^m$ and m bits can be transmitted at each signaling instant. The signal transmitted at each signaling instant may be represented by a complex data symbol the real part of which is the symbol fed to modulator 6 and the so-called imaginary part of which is the symbol fed to modulator 7. For more details, reference may be made to the book and articles cited above as well as to the book entitled *Signal Theory* by L. E. Franks, published by Prentice-Hall, Inc., Englewood Cliffs, New Jersey, 1969, section 4-4, pp. 79–97, wherein the signal representation methods are discussed. For clarity, a transmitter using the so-called baseband transmission technique has been shown in the figure, but those skilled in the art readily understand that the direct passband transmission technique could also be employed, using, for example, the digital echo transmitter disclosed in French Pat. No. 70 40292, published under No. 2 110 845, filed by the assignee of this application and corresponding to U.S. Pat. No. 3,747,024, issued July 17, 1973, to M. F. Choquet et al. The signal received from transmission channel 11 is fed to the input of the 90° phase shifter 12. The latter type of device is also known as a Hilbert transformer and supplies the in-phase and quadrature components of the received signal. As is known, a Hilbert transformer is usually comprised of two conventional passband filters, one of whose outputs is 90° in phase later than the other. The in-phase and quadrature components of the received signal are fed to the inputs of the complex transversal equalizer 18, which may be of the type disclosed, for example, in assignee's French patent application No. 73 26404, published as No. 2 237 379 and corresponding to U.S. Pat. No. 3,947,768, issued Mar. 30, 1976, to A. E. Desblache et al. The equalized in-phase and quadrature components are then applied to the input of detection device 20, which may be similar to that disclosed, for example, in assignee's French patent application No. 74 43560, corresponding to U.S. patent application Ser.

No. 629,460, filed Nov. 6, 1975, by A. Croisier et al now U.S. Pat. No. 4,024,342.

In the training mode operation, to which the present invention is directed, it will be assumed by way of example that the system uses as the training sequence, a periodic pseudo-random sequence of the type disclosed and referred to as a "CAZAC sequence" in the above French patent application Ser. No. 75 40417 (U.S. Ser. No. 743,022 now U.S. Pat. No. 4,089,061). As has been mentioned above, any periodic sequence would be suitable. One may select, for example, the CAZAC sequence $(u_i)$ of length $N=K^2$ defined as $$u_1 = W^{\beta\gamma}$$

where $\beta, \gamma = 0, 1, \ldots, (K-1)$
$i = K\beta + \gamma = 0, 1, \ldots, (N-1)$, and
$W$ is a primitive $K^{th}$ root of unity,
e.g. $W = \exp(2j\pi/K)$ The sequence can be obtained by reading the elements in the successive rows of the matrix $(W^{\beta\gamma})$.

For example, for $K=4$, $L=16$, and $W=\exp(j\pi/2)$, the matrix $(W^{\beta\gamma})$ is written $$(W^{\beta\gamma}) = \begin{bmatrix} \exp(0 \times j\pi/2) & \exp(0 \times j\pi/2) & \exp(0 \times j\pi/2) & \exp(0 \times j\pi/2) \\ \exp(0 \times j\pi/2) & \exp(j\pi/2) & \exp(2 \times j\pi/2) & \exp(3 \times j\pi/2) \\ \exp(0 \times j\pi/2) & \exp(2 \times j\pi/2) & \exp(4 \times j\pi/2) & \exp(6 \times j\pi/2) \\ \exp(0 \times j\pi/2) & \exp(3 \times j\pi/2) & \exp(6 \times j\pi/2) & \exp(9 \times j\pi/2) \end{bmatrix}$$

or:

$$(W^{\beta\gamma}) = \begin{pmatrix} 1 & 1 & 1 & 1 \\ 1 & j & -1 & -j \\ 1 & -1 & 1 & -1 \\ 1 & -j & -1 & j \end{pmatrix}$$

The following sequence $(u_i)$ is obtained from this matrix:

1 1 1 1 1 j −1 −j 1 −1 1 −1 1 −j −1 j

The autocorrelation matrix u of this sequence $(u_i)$ is written:

$$U = \begin{bmatrix} U_0 & U_1 & U_2 \ldots & U_{N-1} \\ U_1 & U_0 & U_1 & U_{N-2} \\ U_2 & U_1 & U_0 & \cdot \\ \cdot & & & \cdot \\ \cdot & & & \cdot \\ \cdot & & & U_1 \\ U_{N-1} & \ldots & \ldots & U_0 \end{bmatrix}$$

where
$U_g$ is the $g^{th}$ coefficient of the periodic autocorrelation function $$U_g = \sum_{i=0}^{N-1} u_i u^*_{i+g}$$

for $g = 0, 1, \ldots, (N-1)$, and
$U^*_{i+g}$ is the conjugate complex of $u_{i+g}$.

It can be demonstrated that this sequence $(u_i)$ has the following property:
$U_0 \neq 0$ and $u_g = 0$ for $g = 1, \ldots, (N-1)$
and that all its elements have a constant amplitude. For a detailed description of the CAZAC sequence, reference should be made to the aforementioned French patent application No. 75 40417 (U.S. Ser. No. 743,022 now U.S. Pat. No. 4,089,061).

Still referring to FIG. 3, switches 4, 5, 13 and 14 are set to position A in the training mode of operation. At each signaling instant, sequence generator 3 supplies the real part symbol and the so-called imaginary part symbol, which symbols are modulated by modulators 6 and 7, respectively, of one of the elements of the sequence. Generator 3 may simply consist of two N-stage shift registers 9 and 10 that employ feedback connections and respectively store the real part symbols and the imaginary part symbols of the elements of the sequence. The contents of the two registers are simultaneously shifted at the signaling rate under control of a clock 39. At the receiving end, the phase shifter 12 provides the symbols for the real and imaginary parts of the received signal to the coefficient generator 15. At the end of the training period, generator 15 supplies via lines 19, the initial values of the filter coefficients to equalizer 18. Each of switches 4, 5, 13 and 14 is then set to position B and the data are transmitted.

The coefficient generator 15 will now be described in detail with reference to FIG. 4.

It will be assumed that the transmitted CAZAC sequence has a length $N=16$ and that the complex equalizer 18 has $N=16$ complex coefficients. The second step of the method of the present invention consists in modulating the received signal by means of a window signal as defined above. The triangular window shown in FIG. 5 will be selected by way of example. This window signal is 32T wide and its maximum amplitude is equal to unity. Since the received sequence elements, $s_n$, are received at the signaling rate 1/T, the window signal is defined by 32 samples separated by a T-sec interval. These samples, referred to hereafter as weighting factors, vary linearly from 0 to 1 during the first sixteen signaling periods and from 1 to 0 during the next sixteen signaling periods by increments of 1/15 of the maximum amplitude. Since the modulation operation corresponds to a multiplication, the device of FIG. 4 carries out step 2 of the present method in the following manner.

The real and imaginary symbols for the parts of the elements $s_n$ of the received sequence are respectively applied via lines 16 and 17, each being one of the inputs to an associated one of two multipliers 21 and 22. The other input of each of multipliers 21 and 22 is connected to the output of a weighting factor generator 23. Generator 23 may be comprised of a 32-stage four-bit wide shift register 40 for storing the 32 values ranging between 0 and 1 and 1 and 0 illustrated in FIG. 5. Shift register 40 has the output of the first stage feedback connected to the input of the 32nd stage as illustrated in FIG. 4. Digital representations of the 32 successive four-bit weighting factor that define the triangular window as illustrated in FIG. 5 are respectively stored in the 32 stages of the shift register 40. The feedback connection causes the 32 four-bit weighting factors representations to be reloaded into the shift register while they are read out therefrom to permit a further initial coefficient values determination process to take place afterwards, if required. The contents of the register are shifted at the rate 1/T such that, when the real and imaginary symbols for the parts of the first element of the received sequence are applied to the inputs of multipliers 21 and 22, respectively, generator 23 will feed the first weighting factor to these multipliers. Thus, the first weighting factor is simultaneously multiplied by the symbols for the real and imaginary parts of the first element in multipliers 21 and 22. When the symbols for the real and imaginary parts of the second element are received, generator 23 will be supplying the second weighting factor, and so on. The outputs of multipliers 21 and 22 are connected to the input of a Fourier transform generator 24 that computes the DFT. Generator 23 carries out step 3 of the method of the present invention. Since the triangular window signal is defined by 32 samples, the DFT should be computed in accordance with the conventional expression $$W_i = \sum_{n=0}^{31} s_n \exp[-2\pi j (f_c - \frac{i}{NT}) nT] \quad (7)$$

for $i = 0, 1, \ldots, 31$.

Expression (7) will, therefore, provide 32 coefficients, i.e., 32 points of the weighted signal spectrum which points have a spacing of 1/32T Hz. As the signal received is, before the weighting operation, a periodic signal of period 16T, its Fourier transform consists of rays having a spacing of 1/16T Hz, and not a spacing of 1/32T Hz. Therefore, only 16 of the 32 points provided by expression (7) are significant. Since equalizer 18 uses only 16 coefficients, not all of the 32 DFT coefficients will be required and only every second coefficient need be computed.

For these coefficients, the Fourier transform generator 24 only needs to use expression (8), which is directly derived from expression (7):

$$W_{2i} = \sum_{n=0}^{31} s_n \exp[-2\pi j (f_c - \frac{2i}{nT}) nT] \quad (8)$$

for $i = 0, 1, \ldots, 15$.

Expression (8) provides every second DFT coefficient as defined by expression (7), i.e., 16 points of the weighted signal spectrum. For clarity, the 16 points of the weighted signal spectrum will be designated $W_k$-$W_{2i}$ hereafter.

It is to be noted that since elements $s_n$ are in the form of complex numbers, the $W_k$ will also be in the form of complex numbers and this will provide a measurement of both the amplitude and the phase of the spectrum at the 16 points under consideration. Generator 24 will not be described in detail as many such devices capable of computing a DFT are commercially available at the present time. The so-called fast Fourier transform (FFT) may be used; reference may be made in this regard to the articles entitled "What Is The Fast Fourier Transform," by Cochran et al, in *IEEE Transactions on Audio and Electroacoustics*, June 1967, pp. 45–55; "Digital Real-Time Spectral Analysis," by G. D. Bergland and Hale, in *IEEE Transactions on Electronic Computers*, April 1967, pp. 180–185; "A Digital Processor to Generate Spectra in Real Time," by R. R. Shiveley, in *IEEE Transactions on Computers*, Vol. 2-17, No. 5, May 1968; and "Fast Fourier Transform Hardware Implementations," by G. D. Bergland, in *IEEE Transactions on Audio and Electroacoustics*, June 1969, Vol. AU17, pp. 104–108.

Step 4 of the present method consists in calculating the ratio $$F_k = Z_k / W_k$$

derived from expression (6'), where $Z_k$ is the DFT of the transmitted CAZAC sequence.

Since quantities $Z_k$, $F_k$ and $W_k$ are complex representations, it is convenient to rewrite expression (6') in the form $$F_k = \frac{Z_k \times W^*_k}{|W_k|^2} \quad (9)$$

where $W_k^*$ is the conjugate complex of $W_k$, $k = 0, 1, \ldots, 15$.

In order to use expression (9), step 4 of the present method has been split into four elementary mathematical operations:

Step 4-1 in which $|W_k|^2$ is calculated:

$$|W_k|^2 = |Re(W_k)|^2 + |Im(W_k)|^2 \quad (10)$$

where
$Re(W_k)$ = the real part of $W_k$, and
$Im(W_k)$ = the imaginary part (not including i) of $W_k$ Step 4-2 in which $$G_k = Z_k \times W_k^* \quad (11)$$

is calculated. Expression (11) can be expanded to $$Re(G_k) = Re(Z_k) \cdot Re(W_k^*) - Im(Z_k) \cdot Im(W_k^*)$$

$$Im(G_k) = Re(W_k^*) \cdot Im(Z_k) + Re(Z_k) \cdot Im(W_k^*) \text{ or:}$$

$$Re(G_k) = Re(Z_k) \cdot Re(W_k) + Im(Z_k) \cdot Im(W_k)$$

$$Im(G_k) = Re(W_k) \cdot Im(Z_k) - Re(Z_k) \cdot Im(W_k) \quad (12)$$

Step 4-3 in which $|W_k|^2$ is calculated.
Step 4-4 in which $$F_k = G_k \times 1/|W_k|^2 \quad (13)$$

is calculated.

Figure 4:
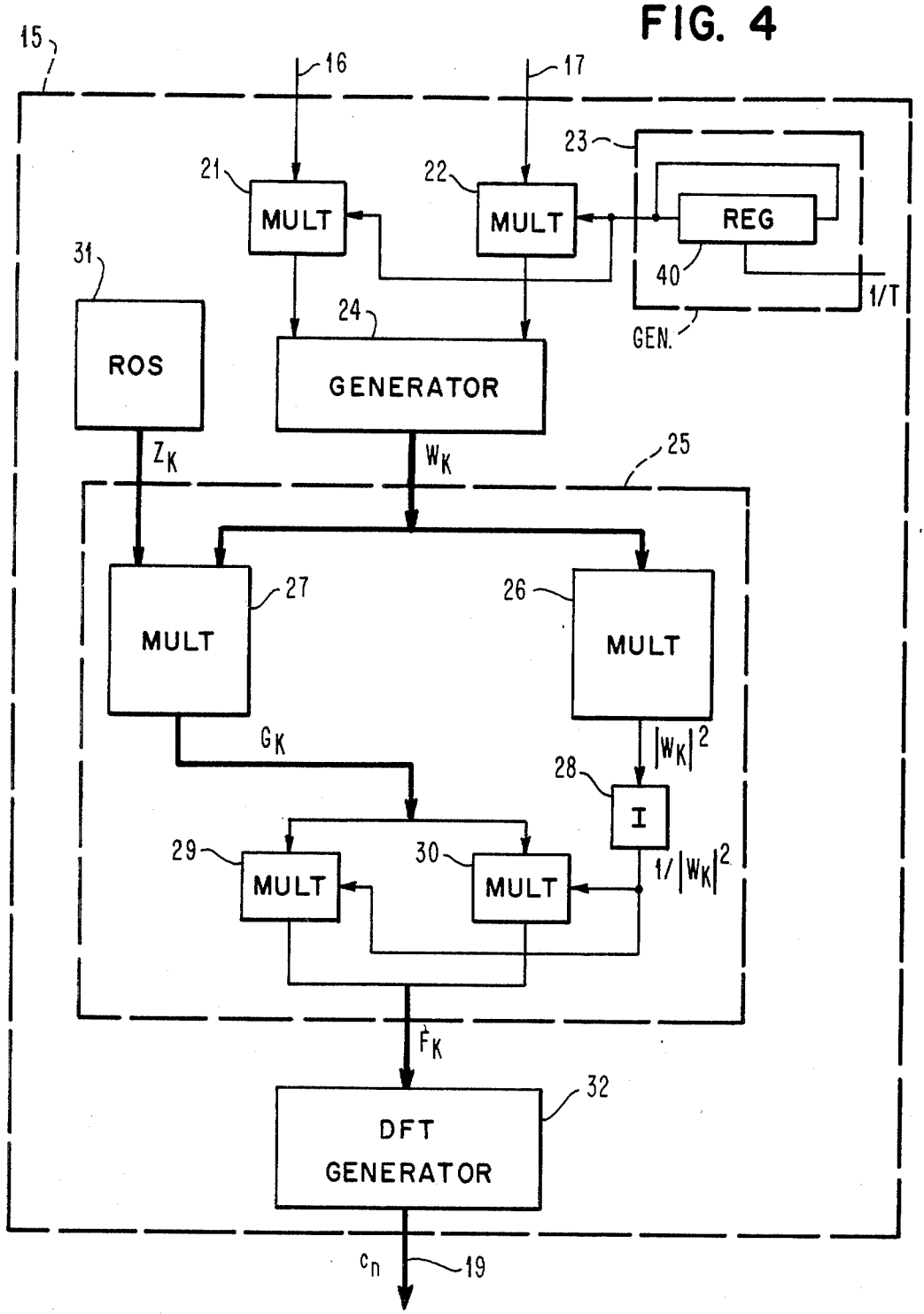
FIG. 4 is a detailed illustration of the coefficient generator shown in block form in FIG. 3.
Figure 5:
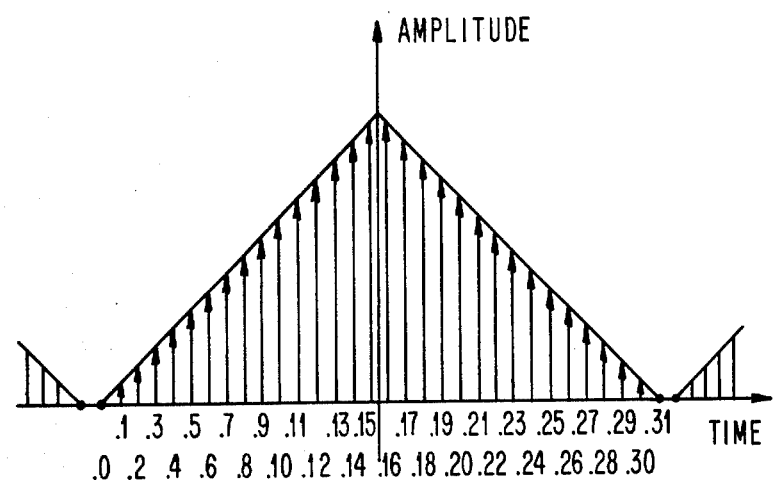
FIG. 5 illustrates the triangular time-domain window signal generated by the weighting factor generator of FIG. 4.

With further reference to FIG. 4, the manner in which Step 4 is carried out by the coefficient generator 15 will now be described.

For clarity, the paths along which the complex quantities are transferred have been shown in heavy lines. The quantity $W_k$ supplied by the Fourier transform generator 24 is applied to a computation unit 25 which computes quantity $F_k$ in accordance with expression (5). Unit 25 comprises two multiplier arrangements 26 and 27, a digital inverter 28, and two multipliers 29 and 30. The multiplier arrangement 26 receives the quantity $W_k$ from generator 24 and computes quantity $|W_k|^2$ in accordance with expression (10). The multiplier arrangement 27 receives the quantity $W_k$ from generator 24 and the quantity $Z_k$ from a read-only storage 31 and computes the components of the quantity $G_k$ in accordance with expressions (12). The quantity $|W_k|^2$ supplied by the arrangement 26 is fed to inverter 28 which supplies the quantity $1/|W_k|^2$. An exemplary embodiment of inverter 28 will be described later with reference to FIG. 6. The quantity $1/|W_k|^2$ as supplied by inverter 28 is fed to an input of each of multipliers 29 and 30, the other inputs of which receive the real part and the imaginary part, respectively, of the quantity $G_k$ supplied by the multiplier arrangement 27. Multipliers 29 and 30 supply the real part and the imaginary part of quantity $F_k$.

As has just been explained, the ratio $Z_k/W_k$ provides $F_k$, the DFT of the coefficients of the equalizer. Those skilled in the art will appeciate that the inverse ratio, i.e., $W_k/Z_k$, provides a measure of the spectrum of the transmission channel.

Still referring to FIG. 4, Step 4, of the present method wherein the inverse DFT of $F_k$ is computed, is carried out by the inverse DFT generator 32. This operation yields the values of the complex coefficients $c_n$ of the complex equalizer 18.

As is well known, the inverse DFT is defined by the expression $$c_n = \frac{1}{N} \sum_{k=0}^{N-1} F_k \exp[2\pi j (f_c - \frac{k}{NT}) nT] \quad (14)$$

The inverse DFT generator 32 will not be described in detail as many devices of this type are commercially available at the present time. For example, the so-called inverse FFT (fast Fourier transform) technique described in the articles cited above may be used.

Figure 6:
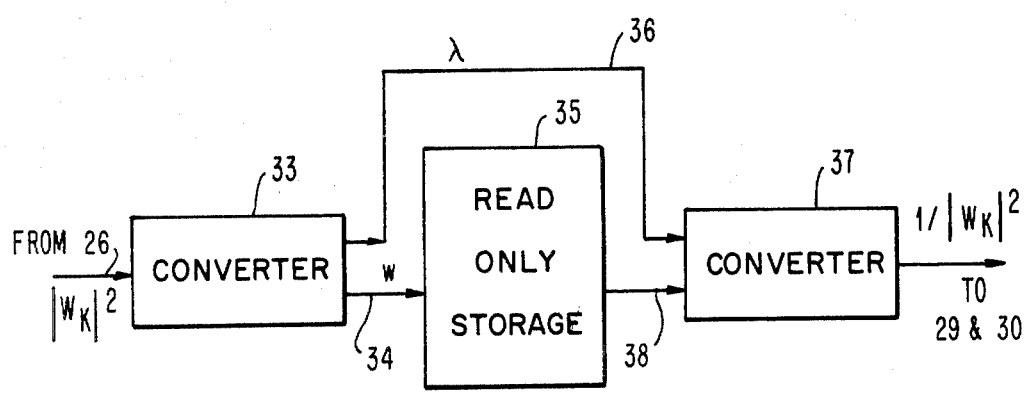
FIG. 6 shows an exemplary embodiment of the inverter of FIG. 4.

Referring now to FIG. 6, a preferred embodiment of the inverter 28 of FIG. 4 is shown. The quantity $|W_k|^2$ supplied by the arrangement 26 (FIG. 4) is applied to the input of a fixed point-to-floating point converter 33, a first output of which is connected via line 34 to a read-only storage 35. A second output of converter 33 is connected via line 36 to the first input of a floating point-to-fixed point converter 37, the second input of which is connected via line 38 to the output of ROS 35. Converter 37 supplies the quantity $1/|W_k|^2$ at its output.

The operation of the inverter shown in FIG. 6 will now be described.

In floating point notation, the quantity $|W_k|^2$ is written $$|W_k|^2 = 2^\lambda \cdot w \quad (15)$$

where
$\lambda$ is the exponent, and
$w$ is the mantissa.
From expression (15) we may write $$1/|W_K|^2 = 1/w \cdot 2^{-\lambda} \quad (16)$$

The inverter shown in FIG. 6 uses expression (16).

Assuming that the quantity $|W_k|^2$ is expressed by a 16-bit word, this quantity could be written in the form $$|W_k|^2 = x_0 x_1 \ldots x_{15}$$

where $x_0$ is the sign bit, which is equal to 0 since $|W_k|^2$ is positive, and $x_{15}$ is the least significant bit.

The fixed point-to-floating point converter 33 determines the first significant bit that is not 0. Let $x_\lambda$ be this bit. The 8-bit word $$x_\lambda \, x_{\lambda+1} \, x_{\lambda+2} \, x_{\lambda+3} \, x_{\lambda+4} \, x_{\lambda+5} \, x_{\lambda+6} \, x_{\lambda+7}$$

is equal to the mantissa $w$ of $|W_k|^2$ and $\lambda$ is the exponent of $|W_k|^2$ as defined by expression (15).

The mantissa $w$ supplied by converter 33 is applied via line 34 to ROS 35 for a table look-up operation. ROS 35 stores a table that provides the values of $1/w$ for all possible values of $w$. Bit $x_\lambda$ is always 1 since it has been defined as the first significant bit of $|W_k|^2$ that is not 0, so that a table containing no more than $2^7 = 128$ words is all that is required to provide an inverse value for each of all possible values of the mantissa.

Quantity $1/w$ is applied via line 38 to one of the inputs of the floating point-to-fixed point converter 37, which also receives exponent $\lambda$ via line 36. Converter 37 provides a 16-bit word in accordance with expression (16). Converters 33 and 37 are simple devices with functions that are conventional and widely used in digital computers and need not be described here in more detail.

While the invention has been particularly shown and described with reference to a preferred embodiment thereof, it will be understood by those skilled in the art that numerous changes in form and detail may be made therein without departing from the spirit and scope of the invention.

What is claimed is:

1. A method of determining the initial values of the coefficients of a transversal equalizer for use in a synchronous data transmission system having a transmission channel, said method characterized in that it includes the steps of:
   a. transmitting a signal comprised of a periodic sequence of data symbols over the transmission channel of said data transmission system;
   b. modulating the signal received from the transmission channel by a time-domain window signal whose Fourier transform exhibits a relatively flat central peak and comparatively low values in the vicinity of those frequencies which are multiples of the inverse of the period of the transmitted sequence;
   c. determining the discrete Fourier transform, $W_k$, of the modulated received signal;
   d. calculating the ratio $$F_k = Z_k/W_k$$

where $Z_k$ is the discrete Fourier transform of the transmitted sequence, and
   e. computing the inverse discrete Fourier transform of ratio $F_k$, to thereby determine the values of the coefficients $c_n$ of the equalizer.

2. A method of determining the initial values of the coefficients of a complex transversal equalizer for use in a synchronous data transmission system having a transmission channel and using double sideband-quadrature carrier modulation, characterized in that said method includes the steps of:
   a. transmitting over said transmission channel a periodic, pseudo-random sequence of data symbols whose elements may be represented by complex numbers, said sequence having a periodic autocorrelation function in which only the first coefficient is not zero, all complex numbers in the sequence having a constant amplitude;
   b. modulating the signal received from said transmission channel by a time-domain window signal whose Fourier transform exhibits a relatively flat central peak and comparatively low values in the vicinity of those frequencies which are multiples of the inverse of the period of the transmitted sequence;
   c. determining the discrete Fourier transform, $W_k$, of the modulated received signal;
   d. calculating the ratio $$F_k = Z_k/W_k$$

where $Z_k$ is the discrete Fourier transform of the transmitted sequence; and e. computing the inverse discrete Fourier transform of ratio $F_k$, to thereby determine the values of the coefficients $c_n$ of the equalizer.

3. Apparatus for determining the initial values of the coefficients of a transversal equalizer in a synchronous data transmission system having a transmitter, a receiver, and a communications channel connecting said transmitter and said receiver characterized in that said apparatus includes:

means located at said transmitter of the system for transmitting a periodic sequence of data representing symbols over said communications channel;

modulation means in said receiver for modulating the signal received from said channel by a time-domain window signal where the Fourier transform of said window signal exhibits a relatively flat central peak and has a comparatively low magnitude in the vicinity of those frequencies which are multiples of the inverse of the period of the transmitted sequence;

means connected to the output of said modulation means for determining data representing the discrete Fourier transform, $W_k$, of said modulated received signal;

a first storage means for storing data representing the discrete Fourier transform, $Z_k$, of the transmitted periodic sequence;

means connected to said determining means and said first storage means for calculating the ratio $$F_k = Z_k/W_k; \text{ and}$$

means on the output of said calculating means to derive the factors representing the inverse Fourier transform of $F_k$, to thereby determine the values of the coefficients $c_n$ of the equalizer.

4. An apparatus as set out in claim 3 and further characterized in that said modulation means includes:

a second storage means for storing representations of the weighting factors that define the amplitude of said time-domain window signal at points separated from each other by an interval of T sec., where 1/T is the rate at which the data representing symbols of said periodic sequence are received; and a multiplication means for successively multiplying the successive amplitudes of the received signal by said weighting factors.

5. Apparatus for determining the initial value of the coefficients of a complex transversal equalizer in a data transmission system having a transmitter, a receiver and a communications channel connecting said transmitter and said receiver, said system using double sideband-quadrature carrier modulation and characterized in that it includes:

means located at said transmitter of the system for transmitting over said channel, a periodic pseudo-random sequence of data symbols whose elements are representable as complex numbers, said sequence having a periodic autocorrelation function only the first coefficient of which is not zero, and in which all complex numbers in the sequence have a constant amplitude;

modulation means in said receiver and connected to said transmission channel for modulating the received signal by a time-domain window signal where the Fourier transform of said window signal exhibits a relatively flat central peak and has comparatively low values in the vicinity of those frequencies which are multiples of the inverse of the period of the transmitted sequence;

means on the output of said modulation means for determining the factors of the discrete Fourier transform, $W_k$, of the modulated received signal;

a storage means for storing factors representing the discrete Fourier transform, $Z_k$, of one period of the transmitted sequence of data symbols;

means connected to said discrete Fourier transform determining means and to said storage means for calculating the ratio $$F_k = Z_k/W_k$$

of said transforms; and means on the output of said calculating means for generating terms representing the inverse Fourier transform of $F_k$, to thereby determine the values of the coefficients $c_n$ of the equalizer.

6. An apparatus as set out in claim 5 and further characterized in that said modulation means includes:

a second storage means for storing representations of the weighting factors that define the amplitude of said time-domain window signal at points separated from each other by an interval of T sec., where 1/T is the rate at which the data representing symbols of said periodic sequence are received; and a multiplication means for successively multiplying the successive amplitudes of the received signal by said weighting factors.

7. A method as set out in claim 1, characterized in that said time-window signal is a triangular signal having a width equal to twice the period of said periodic sequence.

8. An apparatus as set out in claim 3 characterized in that said time-window signal is a triangular signal having a width equal to twice the period of said periodic sequence.

9. A method as set out in claim 2, characterized in that said time-window signal is a triangular signal having a width equal to twice the period of said periodic sequence.

10. An apparatus as set out in claim 4, characterized in that said time-window signal is a triangular signal having a width equal to twice the period of said periodic sequence.

11. An apparatus as set out in claim 5, characterized in that said time-window signal is a triangular signal having a width equal to twice the period of said periodic sequence.

12. An apparatus as set out in claim 6, characterized in that said time-window signal is a triangular signal having a width equal to twice the period of said periodic sequence.

* * * * *